US012492986B2

(12) United States Patent
Hwang

(10) Patent No.: US 12,492,986 B2
(45) Date of Patent: Dec. 9, 2025

(54) SENSOR DEVICE FOR DETECTING BIOLOGICAL PARTICLES AND NON-BIOLOGICAL PARTICLES

(71) Applicant: NIDS CO., LTD., Seongnam-si (KR)

(72) Inventor: Hak In Hwang, Seoul (KR)

(73) Assignee: NIDS CO., LTD., Seongnam-si (KR)

( * ) Notice: Subject to any disclaimer, the term of this patent is extended or adjusted under 35 U.S.C. 154(b) by 108 days.

(21) Appl. No.: 18/691,042

(22) PCT Filed: Aug. 22, 2022

(86) PCT No.: PCT/KR2022/012541
§ 371 (c)(1),
(2) Date: Mar. 11, 2024

(87) PCT Pub. No.: WO2023/048406
PCT Pub. Date: Mar. 30, 2023

(65) Prior Publication Data
US 2024/0377317 A1 Nov. 14, 2024

(30) Foreign Application Priority Data
Sep. 23, 2021 (KR) .................. 10-2021-0125922

(51) Int. Cl.
G01N 15/14 (2024.01)
G01N 21/33 (2006.01)
G01N 21/64 (2006.01)
G02B 5/10 (2006.01)
G02B 5/20 (2006.01)
G02B 27/09 (2006.01)

(52) U.S. Cl.
CPC ............. *G01N 21/33* (2013.01); *G01N 15/14* (2013.01); *G01N 21/64* (2013.01); *G02B 5/10* (2013.01); *G02B 5/20* (2013.01); *G02B 27/09* (2013.01)

(58) Field of Classification Search
CPC ........ G01N 21/33; G01N 15/14; G01N 15/02; G01N 15/0205; G01N 21/64; G01N 15/075
See application file for complete search history.

(56) References Cited

U.S. PATENT DOCUMENTS 9,795,329 B2 * 10/2017 Gerlitz ................ A61B 5/6816
2017/0030822 A1 2/2017 Matsunami et al.
(Continued)

FOREIGN PATENT DOCUMENTS

| JP | 6688966 B2 | 4/2020 |
| JP | 6932156 B2 | 9/2021 |
| KR | 10-1246661 B1 | 3/2013 |

(Continued)

OTHER PUBLICATIONS

International Search Report for PCT/KR2022/012541 mailed Nov. 18, 2022 from Korean Intellectual Property Office.

Primary Examiner — Abdullahi Nur
(74) Attorney, Agent, or Firm — Revolution IP, PLLC

(57) ABSTRACT

A sensor device for detecting biological particles and non-biological particles includes: at least one light-source unit for radiating ultraviolet rays; and a light-condensing mirror unit including a first light-condensing mirror unit disposed in front of the at least one light source unit and a second condensing mirror unit spaced apart from the first light-condensing mirror unit.

16 Claims, 8 Drawing Sheets

(56) References Cited

U.S. PATENT DOCUMENTS

2018/0321147 A1 11/2018 Nakai
2020/0232921 A1 7/2020 Kim et al.

FOREIGN PATENT DOCUMENTS

| KR | 10-1419654 B1 | 7/2014 | |
|---|---|---|---|
| KR | 10-1749994 B1 | 6/2017 | |
| KR | 10-2019-0024028 A | 3/2019 | |
| WO | WO-2019244325 A1 * | 12/2019 | ............. G01N 21/94 |

* cited by examiner

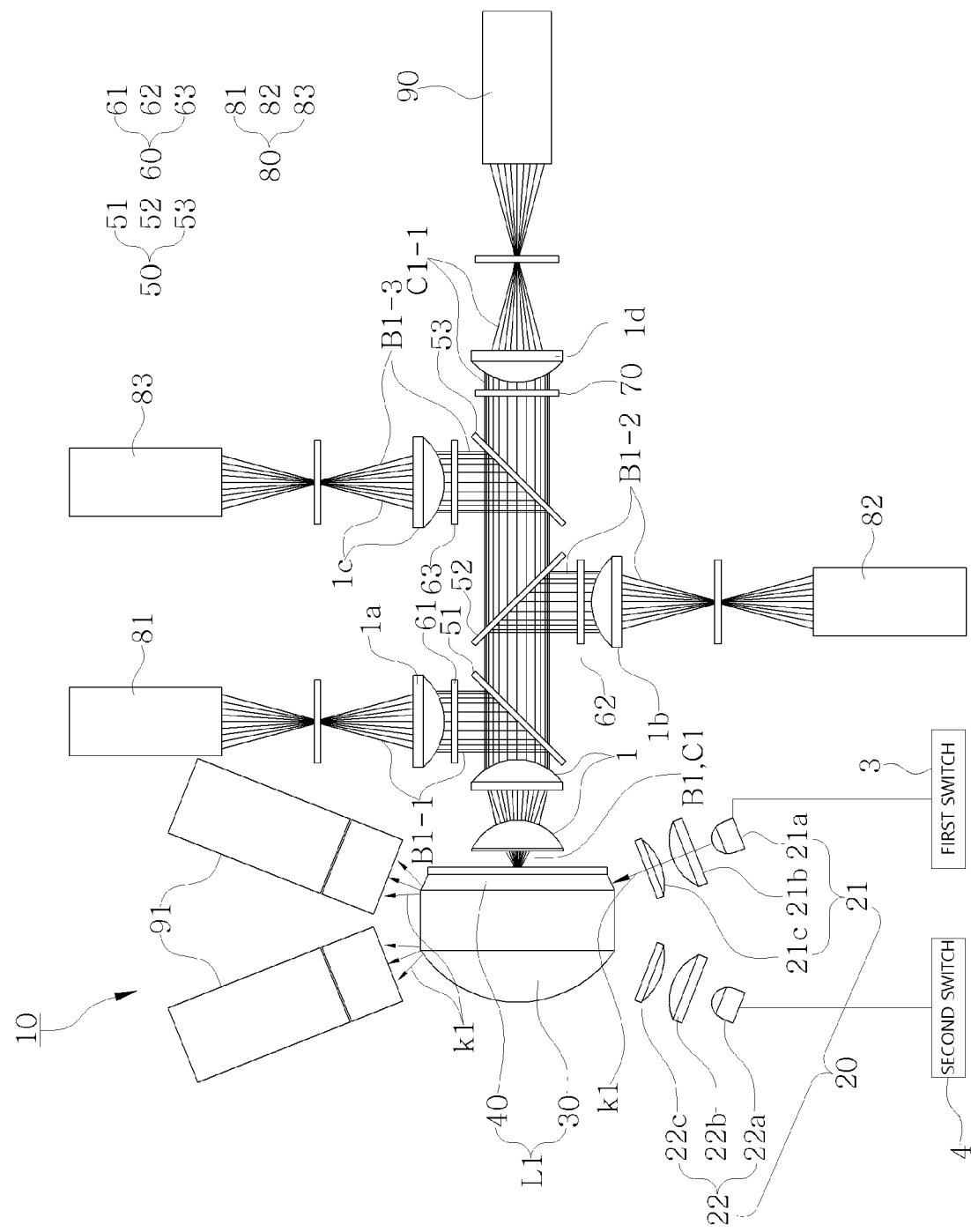
[FIG. 1]

[FIG. 2]
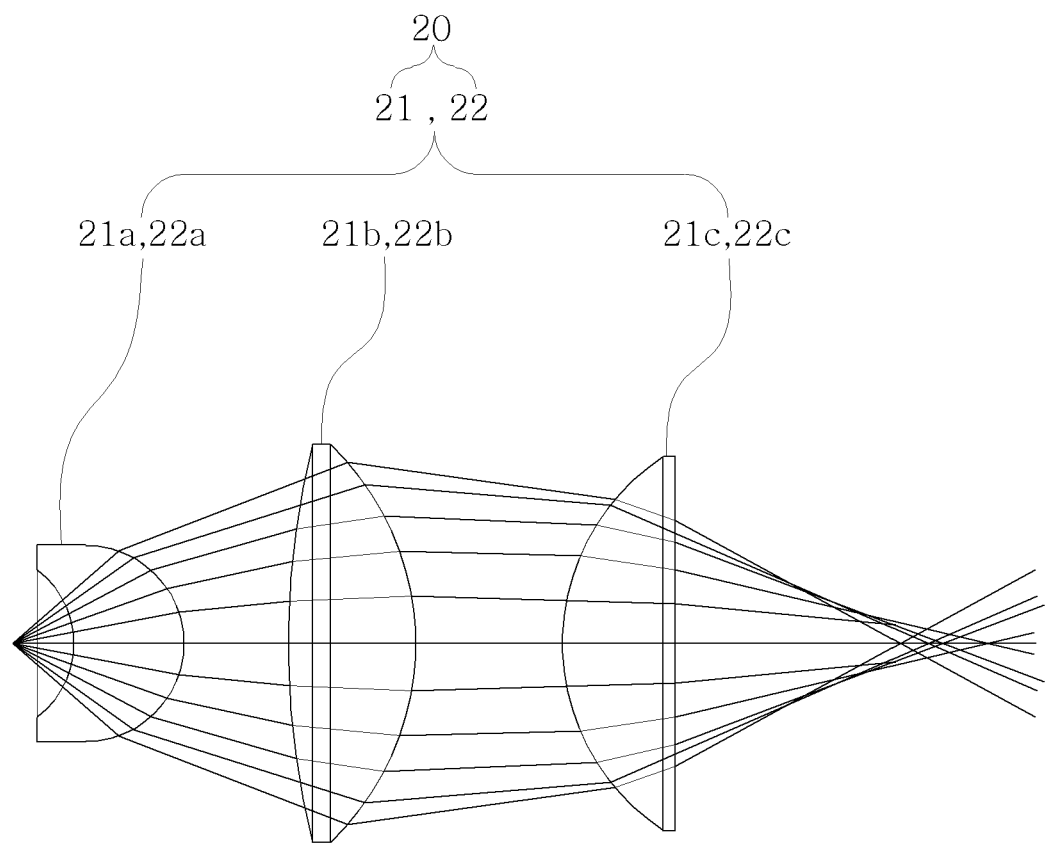

[FIG. 3]
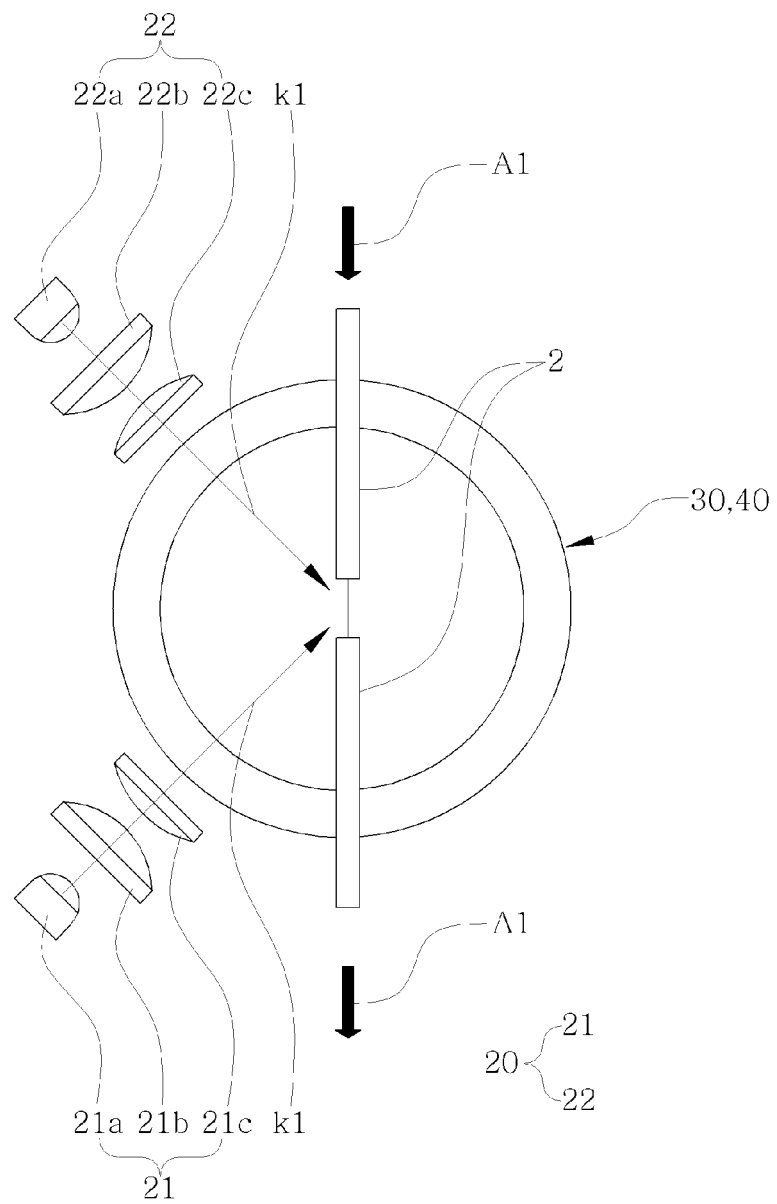

【FIG. 4】
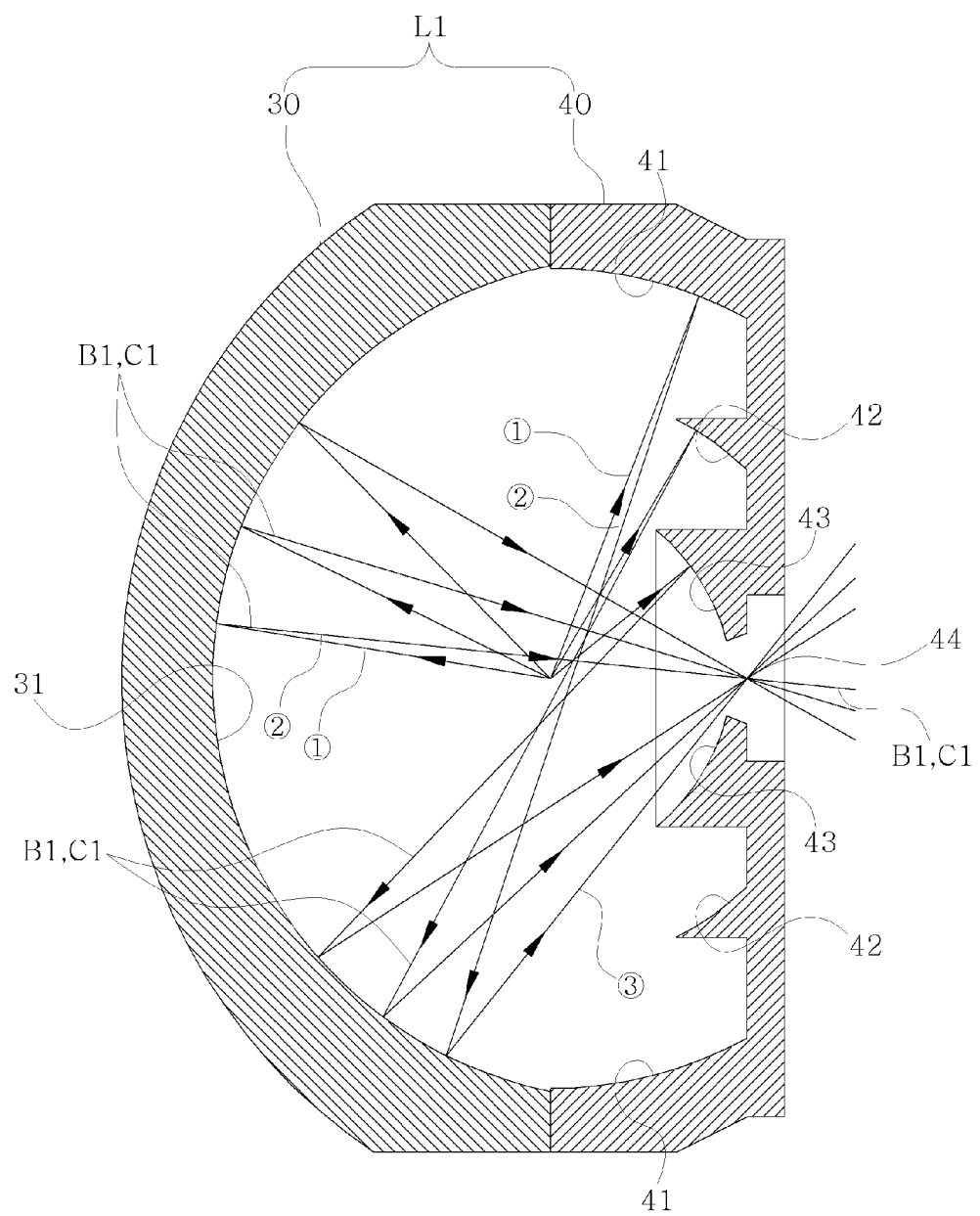

【FIG. 5】
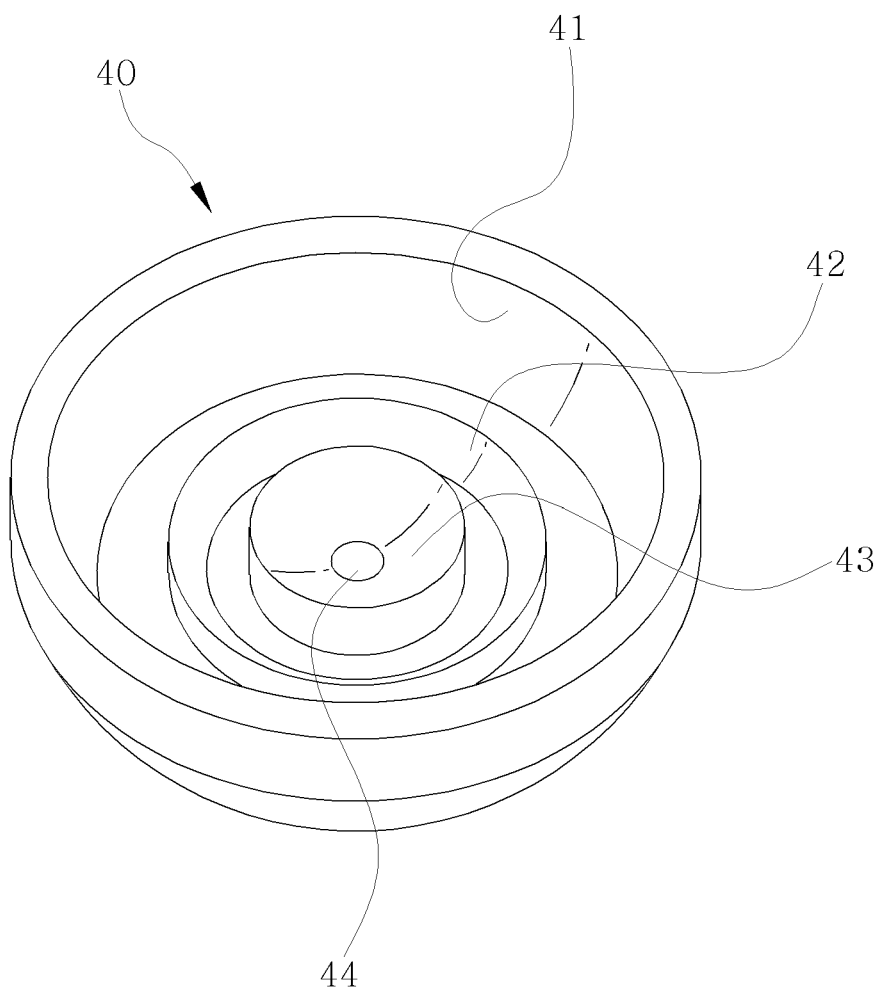

【FIG. 6】
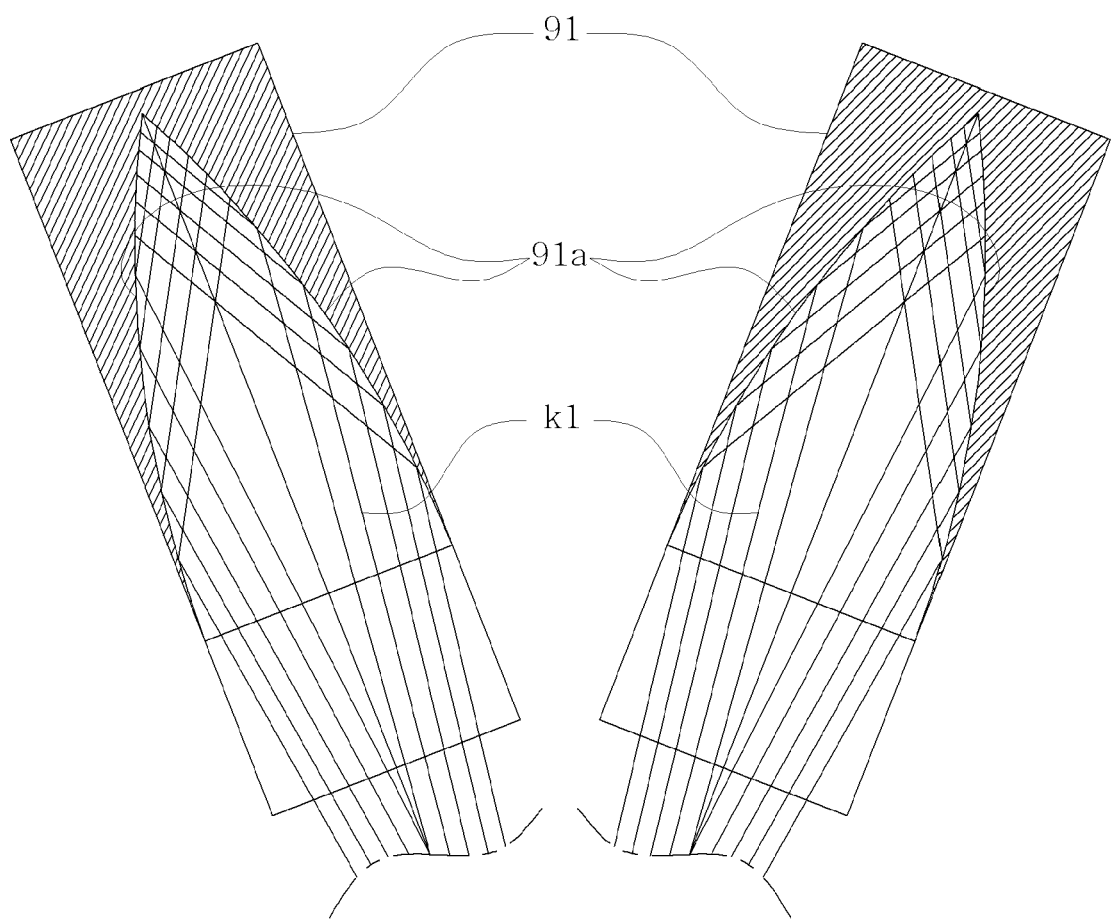

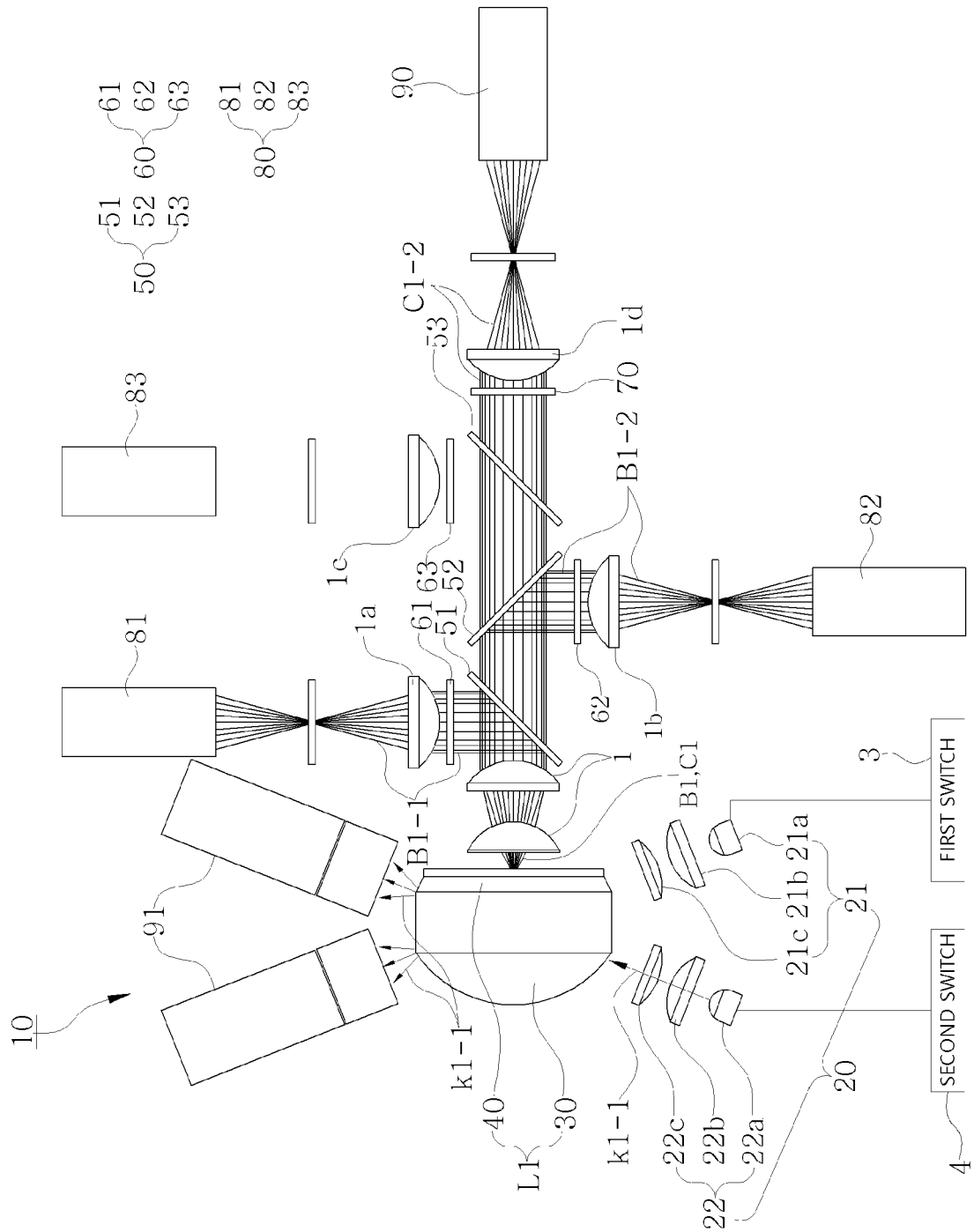

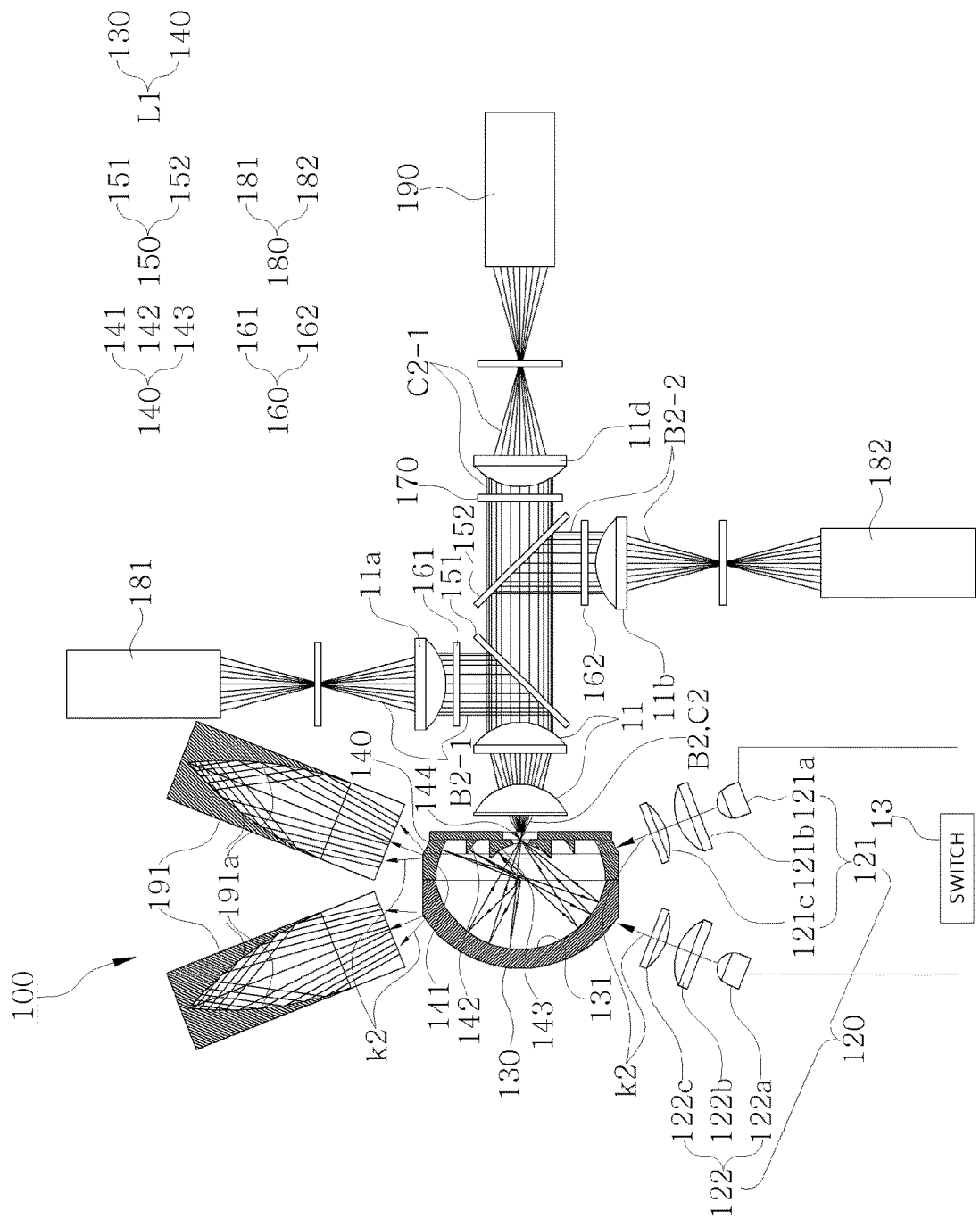
[FIG. 8]

SENSOR DEVICE FOR DETECTING BIOLOGICAL PARTICLES AND NON-BIOLOGICAL PARTICLES

TECHNICAL FIELD

Various embodiments of the present invention relate to a sensor device for detecting biological particles and non-biological particles using a fluorescent signal and a scattered signal.

BACKGROUND ART

Although invisible to the eye, the air contains a variety of microscopic biological particles entrained in the air. These biological particles may include floating allergens that cause allergies (e.g., pollen), various pathogens (e.g., bacteria and viruses), and biological weapons, such as anthrax, which may pose a significant threat to human health. Therefore, there is a need for a sensor device capable of detecting visually identifiable microscopic biological particles floating in the air.

For example, biological weapons used in bioterrorism have become increasingly dangerous in recent years because they are easy to manufacture, simple to transport and distribute, and may be widely transmitted during the incubation period by carriers on public transportation and high-speed vehicles, causing psychological panic and extreme economic disruption. As evidenced by the economic and social impact of recent outbreaks of MERS, severe acute respiratory syndrome (SARS), etc. in many countries, it is predicted that man-made terrorist attacks will cause even greater panic. Therefore, there is a need for a separate sensor device capable of detecting toxic biological particles such as bacteria artificially released into the air by terrorists in real time.

The sensor device radiates ultraviolet light to biological particles and measures a unique fluorescent signal generated by the biological particles to detect the biological particles. To this end, the sensor device may be provided with a mirror unit configured to reflect a fluorescent signal of biological particles generated by light from a light source and to transmit the fluorescent signal to a detection unit and the mirror unit may include first and second mirror units. For example, the first and second mirror units are configured such that air is introduced between the first and second mirror units in the state in which the first and second mirror units are spaced apart from each other, light from the light source is radiated to the introduced air to generate a fluorescent signal of biological particles contained in the air, and the generated fluorescent signal is reflected through a curved spherical mirror formed at each of the first and second mirror units.

However, it is necessary for each of the first and second mirror units included in the mirror unit of the conventional sensor device to have a single spherical mirror of a hemispherical size to reflect the fluorescent signal, which increases the thickness of the first and second mirror units. For this reason, the conventional sensor device is limited in thinning and miniaturization of a product due to the increased thickness of the mirror unit.

A prior art document related to the present invention includes Korean Registered Patent No. 10-1419654 (registered on Jul. 8, 2014), which discloses an "optical particle detection device and particle detection method."

DISCLOSURE

Technical Problem

Various embodiments of the present invention provide a sensor device for detecting biological particles and non-biological particles, wherein the sensor device includes a condensing mirror unit having a plurality of spherical mirrors instead of a conventional single spherical mirror in order to thin and miniaturize a product, thereby reducing the thickness of the product.

In various embodiments of the present invention, the sensor device further includes a plurality of beam splitters and a plurality of fluorescent filters disposed along the path of a fluorescent signal emitted from first and second condensing mirror units included in the condensing mirror unit and at the same time disposed above and under the path of the fluorescent signal so as to be staggered from each other in different directions, whereby it is possible to thin, miniaturize, and slim the product much more than a conventional structure the plurality of beam splitters and the plurality of fluorescent filters are disposed side by side in the same direction.

However, the technical objects that are accomplished by the various embodiments of the present invention are not limited to the above technical objects, and other technical objects may be further provided.

Technical Solution

According to various embodiments of the present invention, a sensor device includes at least one light source unit configured to radiate ultraviolet light and a condensing mirror unit including a first condensing mirror unit disposed in front of the at least one light source unit and a second condensing mirror unit disposed spaced apart from the first condensing mirror unit wherein the condensing mirror unit reflects a fluorescent signal of biological particles included in the air generated by irradiation with the ultraviolet light in an air passage between the first condensing mirror unit and the second condensing mirror unit and a scattered signal of non-biological particles included in the air, and the second condensing mirror unit has a plurality of spherical mirrors in order to reduce a thickness of the condensing mirror unit.

According to various embodiments of the present invention, the second condensing mirror unit may include a first spherical reflector having a first curved surface, a second spherical reflector formed in the first spherical reflector, the second spherical reflector having a second curved surface, and a third spherical reflector formed in the second spherical reflector, the third spherical reflector having a third curved surface.

According to various embodiments of the present invention, the sensor device may further include a plurality of beam splitters disposed on the path of the fluorescent signal and the path of the scattered signal, the plurality of beam splitters being configured to pass the scattered signal and to reflect the fluorescent signal so as to be incident on a plurality of fluorescent filters, and a plurality of fluorescent filters disposed in front of the plurality of beam splitters, the plurality of fluorescent filters being disposed at one side of the path of the fluorescent signal and the other side of the path of the fluorescent signal, which is opposite the one side, so as to be staggered from each other in different directions.

According to various embodiments of the present invention, the sensor device may further include a plurality of fluorescent detection units disposed in front of the plurality of fluorescent filters, the plurality of fluorescent detection units being configured to detect the fluorescent signal, and a scattering detection unit disposed in front of a scattering filter disposed on the path of the scattered signal, the scattering detection unit being configured to detect the scattered signal.

According to various embodiments of the present invention, the at least one light source unit may include first and second light source unit the first light source unit may or may not radiate ultraviolet light having a wavelength of 280 nm in response to ON/OFF of a first switch, the second light source unit may or may not radiate ultraviolet light having a wavelength of 350 nm in response to ON/OFF of a second switch, when the first switch is turned ON and the second switch is turned OFF, the first light source unit may radiate ultraviolet light having a wavelength of 280 nm to the first and second condensing mirror units in response to ON of the first switch, and when the first switch is turned OFF and the second switch is turned ON, the second light source unit may radiate ultraviolet light having a wavelength of 350 nm to the first and second condensing mirror units in response to ON of the second switch.

According to various embodiments of the present invention, the plurality of beam splitters may include first, second, and third beam splitters, and when the first light source unit radiates ultraviolet light having a wavelength of 280 nm to the first and second condensing mirror units, the first beam splitter may reflect a fluorescent signal having a wavelength band of 500 to 750 nm, which is a part of a fluorescent signal emitted through the first and second condensing mirror units, the second beam splitter may reflect a fluorescent signal having a wavelength band of 400 to 500 nm, which is a part of the fluorescent signal emitted through the first and second condensing mirror units, the third beam splitter may reflect a fluorescent signal having a wavelength band of 300 to 400 nm, which is a part of the fluorescent signal emitted through the first and second condensing mirror units, and the first, second, and third beam splitters may transmit a scattered signal having a wavelength of 280 nm.

According to various embodiments of the present invention, the plurality of fluorescent filters may include first, second, and third fluorescent filters, and when the first light source unit radiates the ultraviolet light having a wavelength of 280 nm to the first and second condensing mirror units, the first fluorescent filter may transmit the fluorescent signal having a wavelength band of 500 to 750 nm reflected by the first beam splitter, the second fluorescent filter may transmit the fluorescent signal having a wavelength band of 400 to 500 nm reflected by the second beam splitter, and the third fluorescent filter may transmit the fluorescent signal having a wavelength band of 300 to 400 nm reflected by the third beam splitter.

According to various embodiments of the present invention, the scattering filter may transmit a scattered signal having a wavelength of 280 nm.

According to various embodiments of the present invention, when the second light source unit radiates ultraviolet light having a wavelength of 350 nm to the first and second condensing mirror units, the first beam splitter may reflect a fluorescent signal having a wavelength band of 500 to 750 nm, which is a part of a fluorescent signal emitted through the first and second condensing mirror units, the second beam splitter may reflect a fluorescent signal having a wavelength band of 400 to 500 nm, which is a part of the fluorescent signal emitted through the first and second condensing mirror units, and the first and second beam splitters may transmit a scattered signal having a wavelength of 350 nm.

According to various embodiments of the present invention, when the second light source unit radiates ultraviolet light having a wavelength of 350 nm to the first and second condensing mirror units, the first fluorescent filter may transmit the fluorescent signal having a wavelength band of 500 to 750 nm reflected by the first beam splitter, and the second fluorescent filter may transmit the fluorescent signal having a wavelength band of 400 to 500 nm reflected by the second beam splitter.

According to various embodiments of the present invention, the scattering filter may transmit a scattered signal having a wavelength of 350 nm.

According to various embodiments of the present invention, the sensor device may further include a plurality of light absorption units disposed adjacent to the first and second condensing mirror units, the plurality of light absorption units being configured to block the ultraviolet light passing between the first and second condensing mirror units from being incident on the first and second condensing mirror units again, wherein each of the plurality of light absorption units may be provided therein with a curved absorbing reflector configured to reflect and absorb the ultraviolet light.

According to various embodiments of the present invention, the first and second light source units may or may not radiate ultraviolet light having a wavelength of 350 nm in response to ON/OFF of a switch, and when the switch is turned ON, the first and second light source units may radiate ultraviolet light having a wavelength of 350 nm to the first and second condensing mirror units in response to ON of the switch.

According to various embodiments of the present invention, when the first and second light source units radiate ultraviolet light having a wavelength of 350 nm to the first and second condensing mirror units, the first beam splitter may reflect a fluorescent signal having a wavelength band of 500 to 750 nm, which is a part of a fluorescent signal emitted through the first and second condensing mirror units, the second beam splitter may reflect a fluorescent signal having a wavelength band of 400 to 500 nm, which is a part of the fluorescent signal emitted through the first and second condensing mirror units, and the first and second beam splitters may transmit a scattered signal having a wavelength of 350 nm.

According to various embodiments of the present invention, when the first and second light source units radiate ultraviolet light having a wavelength of 350 nm to the first and second condensing mirror units, the first fluorescent filter may transmit the fluorescent signal having a wavelength band of 500 to 750 nm reflected by the first beam splitter, and the second fluorescent filter may transmit the fluorescent signal having a wavelength band of 400 to 500 nm reflected by the second beam splitter.

Advantageous Effects

According to various embodiments of the present invention, a second condensing mirror unit included in a condensing mirror unit may include a plurality of spherical mirrors having a plurality of curved surfaces in order to reduce the thickness of the condensing mirror unit whereby the side thickness of the second condensing mirror unit may be less than the side thickness of a conventional mirror unit having a single spherical mirror while maintaining a function of reflecting the fluorescent signal and the scattered signal. When the condensing mirror unit is disposed in a product, therefore, it is possible to thin, miniaturize, and slim the product.

In addition, a plurality of beam splitters and a plurality of fluorescent filters may be disposed along the path of the fluorescent signal and at the same time disposed above and under the path of the fluorescent signal so as to be staggered from each other in different directions, whereby it is possible to thin, miniaturize, and slim the product much more than a conventional structure in which the plurality of beam splitters and the plurality of fluorescent filters are disposed side by side in the same direction.

DESCRIPTION OF DRAWINGS

FIG. 1 is a side view showing the configuration of a sensor device for detecting biological particles and non-biological particles according to an embodiment of the present invention, wherein the operational state of a first light source unit which is one of at least one light source unit is shown.

FIG. 2 is a front view showing the at least one light source unit of the sensor device for detecting biological particles and non-biological particles according to the embodiment of the present invention.

FIG. 3 is a view showing the structure of the at least one light source unit of the sensor device for detecting biological particles and non-biological particles according to the embodiment of the present invention.

FIG. 4 is a side sectional view showing the operational state of first and second condensing mirror units included in a condensing mirror unit of the sensor device for detecting biological particles and non-biological particles according to the embodiment of the present invention.

FIG. 5 is a perspective view showing the second condensing mirror unit of the sensor device for detecting biological particles and non-biological particles according to the embodiment of the present invention.

FIG. 6 is a side sectional view showing the operation of a plurality of condensing units of the sensor device for detecting biological particles and non-biological particles according to the embodiment of the present invention.

FIG. 7 is a side view showing the configuration of the sensor device for detecting biological particles and non-biological particles according to the embodiment of the present invention, wherein the operational state of a second light source unit which is the other of the at least one light source unit is shown.

FIG. 8 is a side view showing the configuration of a sensor device for detecting biological particles and non-biological particles according to another embodiment of the present invention.

BEST MODE

The present invention may be changed in various manners and may have various embodiments, wherein specific embodiments will be described with reference to the drawings. However, the present invention is not limited to the specific embodiments, and it should be understood that the present invention includes all modifications, equivalents, or substitutions included in the idea and technical scope of the present invention.

Although terms including ordinal numbers, such as "first" and "second," may be used herein to describe various components, these components should not be limited by these terms. These terms are only used to distinguish one component from another component. For example, within the scope defined by the present invention, a first element may be referred to as a second element, and similarly, a second element may be referred to as a first element. The term "and/or" includes any and all combinations of one or more of the associated listed items.

In addition, relative terms, such as "front surface," "rear surface," "upper surface," and "lower surface," which are described with reference to what is visible in the drawings, may be replaced by ordinal numerals such as "first" and "second". The order of ordinal numerals such as "first" and "second" is determined in the mentioned order or arbitrarily determined, and may be changed as necessary.

The terms used in the present application are provided only to described specific embodiments, and do not limit the present invention. Singular forms are intended to include plural forms as well, unless the context clearly indicates otherwise. In the present application, it should be understood that the terms "includes," "has," etc. specify the presence of stated features, numbers, steps, operations, elements, components, or combinations thereof, but do not preclude the presence or addition of one or more other features, numbers, steps, operations, elements, components, or combinations thereof.

Unless otherwise defined, all terms, including technical and scientific terms, used in this specification have the same meanings as those commonly understood by a person having ordinary skill in the art to which the present invention pertains. It will be further understood that terms, such as those defined in commonly used dictionaries, should be interpreted as having meanings consistent with their meanings in the context of the relevant art, and are not to be interpreted in an idealized or overly formal sense unless expressly so defined herein.

A sensor device 10 for detecting biological particles and non-biological particles according to an embodiment of the present invention may be one or a combination of various devices each including a second condensing mirror unit 40 including first, second and third spherical reflectors 41, 42, and 43, whereby it is possible to reduce thickness of a product, and therefore it is possible to thin and miniaturize the product.

FIG. 1 is a side view showing the configuration of a sensor device for detecting biological particles and non-biological particles according to an embodiment of the present invention, wherein the operational state of a first light source unit which is one of at least one light source unit is shown, FIG. 2 is a front view showing the at least one light source unit of the sensor device for detecting biological particles and non-biological particles according to the embodiment of the present invention, FIG. 3 is a view showing the structure of the at least one light source unit of the sensor device for detecting biological particles and non-biological particles according to the embodiment of the present invention, FIG. 4 is a side sectional view showing the operational state of first and second condensing mirror units included in a condensing mirror unit of the sensor device for detecting biological particles and non-biological particles according to the embodiment of the present invention, FIG. 5 is a perspective view showing the second condensing mirror unit of the sensor device for detecting biological particles and non-biological particles according to the embodiment of the present invention, FIG. 6 is a side sectional view showing the operation of a plurality of condensing units of the sensor device for detecting biological particles and non-biological particles according to the embodiment of the present invention, and FIG. 7 is a side view showing the configuration of the sensor device for detecting biological particles and non-biological particles according to the embodiment of the present invention, wherein the operational state of a second light source unit which is the other of the at least one light source unit is shown.

Referring to FIGS. 1 to 7, the sensor device 10 for detecting biological particles and non-biological particles may include at least one light source unit 20 configured to radiate ultraviolet light K1, first and second condensing mirror units 30 and 40 included in a condensing mirror unit, a plurality of beam splitters 50, a plurality of fluorescent filters 60, a scattering filter 70, a plurality of fluorescent detection units 80 including first, second, and third fluorescent detection units 81, 82, and 83, and a scattering detection unit 90. For example, the at least one light source unit 20 may include first and second light source units 21 and 22. The first and second light source units 21 and 22 may respectively include light sources 21a and 22a configured to emit the ultraviolet light K1, parallel lenses 21b and 22b, and focusing lenses 21c and 22c. For example, each of the light sources 21a and 22a may include at least one of an LED, a laser diode (LD), and a harmonic generator laser. For example, light sources other than the LED, the laser diode (LD), and the harmonic generator laser may be used as each of the light sources 21a and 22a.

Here, in the present embodiment, the LED is used as each of the light sources 21a and 22a. The parallel lenses 21b and 22b may be disposed in front of the light sources 21a and 22a, respectively, and may convert the ultraviolet light K1 into parallel light. The focusing lenses 21c and 22c may be disposed in front of the parallel lenses, and may adjust the focus of the ultraviolet light K1 converted into the parallel light.

According to various embodiments, the first light source unit 21 may or may not radiate ultraviolet light K1 having a wavelength of 280 nm in response to ON/OFF of a first switch 3. The second light source unit 22 may or may not radiate ultraviolet light K1 having a wavelength of 350 nm in response to ON/OFF of a second switch 4.

First, the first light source unit 21 may radiate ultraviolet light K1 having a wavelength of 280 nm to the first and second condensing mirror units 30 and 40 a description of which will follow. For example, the first switch 3 may be turned ON and the second switch 4 may be turned OFF. At this time, the first light source unit may radiate ultraviolet light K1 having a wavelength of 280 nm to the first and second condensing mirror units 30 and 40 in response to ON of the first switch 3. At this time, the second light source unit 22 does not radiate ultraviolet light having a wavelength of 350 nm to the first and second condensing mirror units 30 and 40 included in the condensing mirror unit.

For example, the first light source unit 21 may radiate ultraviolet light K1 having a wavelength of 280 nm to the interiors of the first and second condensing mirror units 30 and 40 included in the condensing mirror unit L1 and at the same time may condense the ultraviolet light K1 on a point.

The condensing mirror unit L1 may include a first condensing mirror unit 30 disposed in front of the first and second light source units 21 and 22 and a second condensing mirror unit 40 disposed spaced apart from the first condensing mirror unit 30.

The first and second condensing mirror units 30 and 40 may be disposed in front of the first and second light source portions 21 and 22 while being spaced apart therefrom. For example, the first and second condensing mirror units 30 and 40 may be disposed spaced apart from each other. The first and second condensing mirror units 30 and 40 may allow the ultraviolet light K1 having a wavelength of 280 nm condensed on a point between the first and second condensing mirror units 30 and 40 and the air A1 to intersect each other, at the same time may reflect a fluorescent signal B1 (e.g., fluorescent light) of the biological particles contained in the air and a scattered signal C1 (e.g., scattered light) of the non-biological particles contained in the air, and may emit the signals to the plurality of beam splitters 50, a description of which will follow.

In this state, the first light source unit 21 may radiate ultraviolet light K1 having a wavelength of 280 nm between the first and second condensing mirror units 30 and 40 and at the same time may introduce the ultraviolet light therebetween in a straight line. At this time, air A1 may be introduced between the first and second condensing mirror units 30 and 40 through an air inlet 2 while moving straight, and the ultraviolet light K1 having a wavelength of 280 nm condensed on a point and the air A1 may intersect each other, whereby a fluorescent signal B1 (e.g., fluorescent light) emitted by the fluorescent substance in the biological particles contained in the air A1 and a scattered signal C1 (e.g., scattered light) that is scattered by the non-biological particles contained in the air A1 may be generated.

For example, an emission hole 44 configured to emit the fluorescent signal B1 and the scattered signal C1 may be formed in the first and second condensing mirror units 30 and 40. Consequently, the fluorescent signal B1 and the scattered signal C1 generated by the first and second condensing mirror units 30 and 40 may be reflected and emitted to the plurality of beam splitters 50 through the emission hole 44.

The first condensing mirror unit 30 may include an aspherical reflector 31 having a curved surface, and the second condensing mirror unit 40 may include first, second, and third spherical reflectors 41, 42, and 43. For example, the aspherical reflector 31 of the first condensing mirror unit 30 and the first, second, and third spherical reflectors 41, 42, and 43 of the second condensing mirror unit 40 may face each other while being spaced apart from each other.

For example, the emission hole 44 configured to emit the fluorescent signal B1 and the scattered signal C1 may be formed in the center of the third spherical reflector 43.

In this state, the fluorescent signal B1 and the scattered signal C1 generated at a point between the first and second condensing mirror units 30 and 40 may be reflected by the aspherical reflector 31 of the first condensing mirror unit 30 and radiated to the emission hole 44.

In addition, the fluorescent signal B1 and the scattered signal C1 generated at a point between the first and second condensing mirror units 30 and 40 may be reflected by at least one of the first, second, and third spherical reflectors 41, 42, and 43 of the second condensing mirror unit 40 and radiated to the aspherical reflector 31 of the first condensing mirror unit 30. In addition, the fluorescent signal B1 and the scattered signal C1 generated at a point between the first and second condensing mirror units 30 and 40 may be reflected by all of the first, second, and third spherical reflectors 41, 42, and 43 of the second condensing mirror unit 40 and radiated to the aspherical reflector 31 of the first condensing mirror unit 30.

At this time, the aspherical reflector 31 of the first condensing mirror unit 30 may reflect back the radiated fluorescent signal B1 and the radiated scattered signal C1 and radiate the signals to the emission hole 44.

For example, the paths of the fluorescent signal B1 and the scattered signal C1 generated at a point between the first and second condensing mirror units 30 and 40 may be as follows: the fluorescent signal B1 and the scattered signal C1 may first move to the aspherical reflector 31 of the first condensing mirror unit 30 (①), may be reflected thereby, and may move to the emission hole 44 (②).

At the same time, the fluorescent signal B1 and the scattered signal C1 may move to the first, second, and third spherical reflectors 41, 42, and 43 of the second condensing mirror unit 40 (①), may be reflected thereby, and may move to the aspherical reflector 31 of the first condensing mirror unit 30 (②). At this time, the aspherical reflector 31 of the first condensing mirror unit 30 may reflect back the fluorescent signal B1 and the scattered signal C1 that have moved, and may move the signals to the emission hole 44.

Consequently, the fluorescent signal B1 and the scattered signal C1 may be reflected by the aspherical reflector 31 of the first condensing mirror unit 30 and the first, second, and third spherical reflectors 41, 42, and 43 of the second condensing mirror unit 40 and radiated to the emission hole 44. The radiated fluorescent signal B1 and the radiated scattered signal C1 may be emitted out of the first and second condensing mirror units 30 and 40 through emission hole 44 and at the same time may be radiated to the plurality of beam splitters 50.

According to various embodiments, a plurality of light absorption units 91 configured to absorb the ultraviolet light K1 having a wavelength of 280 nm passing between the first and second condensing mirror units 30 and 40 may be disposed at positions adjacent to the first and second condensing mirror units 30 and 40. For example, each of the plurality of light absorption units 91 may have a curved absorbing reflector 91a configured to reflect the introduced ultraviolet light K1 several times and at the same time to absorb the ultraviolet light. For example, each of the plurality of light absorption units 91 may reflect the ultraviolet light K1 several times and absorb the ultraviolet light using the curved absorbing reflector 91a, thereby blocking the ultraviolet light K1 from being incident back on the first and second condensing mirror units 30 and 40.

According to various embodiments, a first lens 1 configured to convert the fluorescent signal B1 and the scattered signal C1 into parallel light may be disposed between the second condensing mirror unit 40 and the first beam splitter 51 of the plurality of beam splitters 50. For example, the first lens 1 may convert the fluorescent signal B1 and the scattered signal C1 emitted through the emission hole 44 of the first and second condensing mirror units 30 and 40 into parallel light and move the parallel light to the first beam splitter 51.

According to various embodiments, the plurality of beam splitters 50 may be disposed on the path of the fluorescent signal B1 and the path of the scattered signal C1. For example, the plurality of beam splitters 50 may pass the scattered signal C1, and may reflect the fluorescent signal B1 and radiate the fluorescent signal to the plurality of fluorescent filters 60, a description of which will follow.

According to various embodiments, the plurality of fluorescent filters 60 may be disposed in front of the plurality of beam splitters 50. For example, the plurality of fluorescent filters 60 may be disposed at one side of the path of the fluorescent signal B1 and the other side opposite the one side in a staggered manner.

For example, the plurality of beam splitters 50 may include first, second, and third beam splitters 51, 52, and 53. The plurality of fluorescent filters 60 may include first, second, and third fluorescent filters 61, 62, and 63.

For example, the first beam splitter 51 may be disposed on the path of the fluorescent signal B1, and the first fluorescent filter 61 may be disposed in front of the first beam splitter 51.

In addition, the second beam splitter 52 may be disposed on the path of the fluorescent signal B1, and the second fluorescent filter 62 may be disposed in front of the second beam splitter.

At this time, the second fluorescent filter 62 may be disposed in front of the second beam splitter 52 and at the same time disposed so as to be staggered from the first fluorescent filter 61.

For example, the first fluorescent filter 61 may be disposed at one side of the path of the fluorescent signal B1, and the second fluorescent filter 62 may be disposed at the other side of the path of the fluorescent signal B1, which is opposite the one side. For example, as shown in FIG. 1, the first fluorescent filter 61 may be disposed above the path of the fluorescent signal B1, and the second fluorescent filter 62 may be disposed under the path of the fluorescent signal B1.

In this state, the third fluorescent filter 63 may be disposed in front of the third beam splitter 53 and at the same time disposed so as to be staggered from the second fluorescent filter 62. For example, as shown in FIG. 1, the third fluorescent filter 63 may be disposed above the path of the fluorescent signal B1. For example, the third fluorescent filter 63 may be disposed parallel to the first fluorescent filter 61 above the path of the fluorescent signal B1.

In this state, when the first light source unit 21 radiates ultraviolet light K1 having a wavelength of 280 nm to the first and second condensing mirror units 30 and 40, the first beam splitter 51 may reflect a fluorescent signal B1-1 having a wavelength band of 500 to 750 nm, which is a part of the fluorescent signal B1 emitted through the first and second condensing mirror units 30 and 40. At this time, the reflected fluorescent signal B1-1 having a wavelength band of 500 to 750 nm may be radiated to the first fluorescent filter 61.

The first fluorescent filter 61 may transmit the fluorescent signal B1-1 having a wavelength band of 500 to 750 nm so as to be incident on the first fluorescent detection unit 81. For example, a first focusing lens 1a configured to adjust the focus of the fluorescent signal B1-1 having a wavelength band of 500 to 750 nm may be disposed between the first fluorescent filter 61 and the first fluorescent detection unit 81.

The first fluorescent detection unit 81 may convert the incident fluorescent signal B1-1 having a wavelength band of 500 to 750 nm into an electrical signal, may analyze and identify biological particles of the fluorescent signal B1-1 having a wavelength band of 500 to 750 nm based on the converted electrical signal, and may display information about the identified biological particles on a display unit (not shown).

In this case, the biological particles of the fluorescent signal B1-1 having a wavelength band of 500 to 750 nm may be pollen. Consequently, the first fluorescent detection unit 81 may display pollen on the display unit since the biological particles of the fluorescent signal B1-1 having a wavelength band of 500 to 750 nm are pollen.

In addition, the second beam splitter 52 may reflect a fluorescent signal B1-2 having a wavelength band of 400 to 500 nm, which is a part of the fluorescent signal B1 emitted through the first and second condensing mirror units 30 and 40. At this time, the reflected fluorescent signal B1-2 having a wavelength band of 400 to 500 nm may be radiated to the second fluorescent filter 62.

The second fluorescent filter 62 may transmit the fluorescent signal B1-2 having a wavelength band of 400 to 500 nm so as to be incident on the second fluorescent detection unit 82. For example, a second focusing lens 1b configured to adjust the focus of the fluorescent signal B1-2 having a wavelength band of 400 to 500 nm may be disposed between the second fluorescent filter 62 and the second fluorescent detection unit 82.

The second fluorescent detection unit 82 may convert the incident fluorescent signal B1-2 having a wavelength band of 400 to 500 nm into an electrical signal, may analyze and identify biological particles of the fluorescent signal B1-2 having a wavelength band of 400 to 500 nm based on the converted electrical signal, and may display information about the identified biological particles on the display unit (not shown).

In this case, the biological particles of the fluorescent signal B1-2 having a wavelength band of 400 to 500 nm may be bacteria Consequently, the second fluorescent detection unit 82 may display bacteria on the display unit since the biological particles of the fluorescent signal B1-2 having a wavelength band of 400 to 500 nm are bacteria.

In addition, the third beam splitter 53 may reflect a fluorescent signal B1-3 having a wavelength band of 300 to 400 nm, which is a part of the fluorescent signal B1 emitted through the first and second condensing mirror units 30 and 40. At this time, the reflected fluorescent signal B1-3 having a wavelength band of 300 to 400 nm may be radiated to the third fluorescent filter 63.

The third fluorescent filter 63 may transmit the fluorescent signal B1-3 having a wavelength band of 300 to 400 nm so as to be incident on the third fluorescent detection unit 83. For example, a third focusing lens 1c configured to adjust the focus of the fluorescent signal B1-3 having a wavelength band of 300 to 400 nm may be disposed between the third fluorescent filter 63 and the third fluorescent detection unit 83.

The third fluorescent detection unit 83 may convert the incident fluorescent signal B1-3 having a wavelength band of 300 to 400 nm into an electrical signal, may analyze and identify biological particles of the fluorescent signal B1-3 having a wavelength band of 300 to 400 nm based on the converted electrical signal, and may display information about the identified biological particles on the display unit.

In this case, the biological particles of the fluorescent signal B1-3 having a wavelength band of 300 to 400 nm may be viruses. Consequently, the third fluorescent detection unit 83 may display viruses on the display unit since the biological particles of the fluorescent signal B1-3 having a wavelength band of 300 to 400 nm are viruses.

In addition, the scattered signal C1 emitted from the first and second condensing mirror units 30 and 40 may be converted into parallel light through the first lens 1. At this time, the scattered signal C1 converted into the parallel light may pass through the first, second, and third beam splitters 51, 52, and 53. The scattered signal C1 having passed therethrough may be transmitted through the scattering filter 70. At this time, the scattering filter 70 may transmit a scattered signal C1-1 having a wavelength of 280 nm.

The transmitted scattered signal C1-1 having a wavelength of 280 nm may be incident on the scattering detection unit 90. For example, a fourth focusing lens 1d configured to adjust the focus of the scattered signal C1-1 having a wavelength of 280 nm may be disposed between the scattering filter 70 and the scattering detection unit 90.

The scattering detection unit 90 may convert the incident scattered signal C1-1 having a wavelength of 280 nm into an electrical signal, may analyze and determine whether the scattered signal C1-1 having a wavelength of 280 nm indicates biological particles or non-biological particles based on the converted electrical signal, and may display information about the determined non-biological particles on the display unit.

In this case, the non-biological particles of the scattered signal C1-1 having a wavelength of 280 nm may be dust (e.g., fine dust). Consequently, the scattering detection unit 90 may display "dust" (e.g., "fine dust") on the display unit since the non-biological particles of the scattered signal C1-1 having a wavelength of 280 nm are dust.

According to various embodiments, each of the plurality of beam splitters 50 may include a dichroic beam splitter (DBS), and each of the plurality of fluorescent filters 60 and the scattering filters 70 may include a band pass filter (BPF).

According to various embodiments, the first fluorescent detection unit 81 may identify the biological particles as pollen based on the fluorescent signal B1-1 having a wavelength band of 500 to 750 nm incident through the first beam splitter 51, the second fluorescent detection unit 82 may identify the biological particles as bacteria based on the fluorescent signal B1-2 having a wavelength band of 400 to 500 nm incident through the second beam splitter 52, and the third fluorescent detection unit 83 may identify the biological particles as viruses based on the fluorescent signal B1-3 having a wavelength band of 300 to 400 nm incident through the third beam splitter 53.

In addition, the scattering detection unit 90 may identify the non-biological particles as dust (e.g., fine dust) based on the scattered signal C1-1 having a wavelength of 280 nm incident through the scattering filter 70.

FIG. 7 is a side view showing the configuration of the sensor device for detecting biological particles and non-biological particles according to the embodiment of the present invention, wherein the operational state of the second light source unit which is the other of the at least one light source unit is shown.

First, at least one of the components of the sensor device 10 for detecting biological particles and non-biological particles may be identical or similar to at least one of the components of the sensor device 10 shown in FIG. 1, and therefore a duplicate description thereof will be omitted.

As shown in FIG. 7, the second light source unit 22 of the plurality of light source units 20 may or may not radiate ultraviolet light K1-1 having a wavelength of 350 nm in response to ON/OFF of the second switch 4.

For example, the second light source unit 22 may radiate ultraviolet light K1-1 having a wavelength of 350 nm to the first and second condensing mirror units 30 and 40 included in the condensing mirror unit L1, a description of which will follow. For example, the second switch 4 may be turned ON and the first switch 3 may be turned OFF. At this time, the second light source unit 22 may radiate ultraviolet light K1-1 having a wavelength of 350 nm to the first and second condensing mirror units 30 and 40 in response to ON of the second switch 4. At this time, the first light source unit 21 does not radiate ultraviolet light having a wavelength of 280 nm to the first and second condensing mirror units 30 and 40.

For example, the second light source unit 22 may radiate ultraviolet light K1-1 having a wavelength of 350 nm to the interiors of the first and second condensing mirror units 30 and 40 and at the same time may condense the ultraviolet light K1-1 on a point.

At this time, a fluorescent signal B1 contained in the air generated at a point between the first and second condensing mirror units 30 and 40 and a scattered signal C1 contained in the air may be reflected by the aspherical reflector 31 of the first condensing mirror unit 30 and radiated to the emission hole 44. At this time, the radiated fluorescent signal B1 and the radiated scattered signal C1 may be emitted out of the first and second condensing mirror units 30 and 40 through the emission hole 44 and at the same time radiated to the first beam splitter 51 of the plurality of beam splitters 51 and 52.

At the same time, the fluorescent signal B1 and the scattered signal C1 generated at a point between the first and second condensing mirror units 30 and 40 may be reflected by at least one of the first, second, and third spherical reflectors 41, 42, and 43 of the second condensing mirror unit 40 and radiated to the aspherical reflector 31 of the first condensing mirror unit 30. At this time, the aspherical reflector 31 of the first condensing mirror unit 30 may reflect back the radiated fluorescent signal B1 and the radiated scattered signal C1, and may radiate the signals to the emission hole 44.

In addition, the fluorescent signal B1 and the scattered signal C1 may be reflected by all of the first, second, and third spherical reflectors 41, 42, and 43 of the second condensing mirror unit 40 and radiated to the aspherical reflector 31 of the first condensing mirror unit 30. In the same manner, the aspherical reflector 31 of the first condensing mirror unit 30 may reflect back the radiated fluorescent signal B1 and the radiated scattered signal C1, and may radiate the signals to the emission hole 44.

At this time, the fluorescent signal B1 and the scattered signal C1 may be reflected by the aspherical reflector of the first condensing mirror unit 30 and the first, second, and third spherical reflectors 41, 42, and 43 of the second condensing mirror unit 40 and radiated to the emission hole 44. At this time, the radiated fluorescent signal B1 and the radiated scattered signal C1 may be emitted out of the first and second condensing mirror units 30 and 40 through the emission hole 44 and at the same time radiated to the first beam splitter 51 of the plurality of beam splitters 51 and 52.

According to various embodiments, a first lens 1 configured to convert the fluorescent signal B1 and the scattered signal C1 into parallel light may be disposed between the second condensing mirror unit 40 and the first beam splitter 51 of the plurality of beam splitters 50. For example, the first lens 1 may convert the fluorescent signal B1 and the scattered signal C1 emitted through the emission hole 44 of the first and second condensing mirror units 30 and 40 into parallel light and move the parallel light to the first beam splitter 51.

In this state, when the second light source unit 22 radiates ultraviolet light K1-1 having a wavelength of 350 nm to the first and second condensing mirror units 30 and 40, the first beam splitter 51 may reflect a fluorescent signal B1-1 having a wavelength band of 500 to 750 nm, which is a part of the fluorescent signal B1 emitted through the first and second condensing mirror units 30 and 40. At this time, the reflected fluorescent signal B1-1 having a wavelength band of 500 to 750 nm may be radiated to the first fluorescent filter 61 of the plurality of fluorescent filters 60.

The first fluorescent filter 61 may transmit the fluorescent signal B1-1 having a wavelength band of 500 to 750 nm so as to be incident on the first fluorescent detection unit 81.

For example, the first fluorescent detection unit 81 may convert the incident fluorescent signal B1-1 having a wavelength band of 500 to 750 nm into an electrical signal, may analyze and identify biological particles of the fluorescent signal B1-1 having a wavelength band of 500 to 750 nm based on the converted electrical signal, and may display information about the identified biological particles on the display unit (not shown).

In this case, the biological particles of the fluorescent signal B1-1 having a wavelength band of 500 to 750 nm may be pollen. Consequently, the first fluorescent detection unit 81 may display pollen on the display unit since the biological particles of the fluorescent signal B1-1 having a wavelength band of 500 to 750 nm are pollen.

In addition, the second beam splitter 52 may reflect a fluorescent signal B1-2 having a wavelength band of 400 to 500 nm, which is a part of the fluorescent signal B1 emitted through the first and second condensing mirror units 30 and 40. At this time, the reflected fluorescent signal B1-2 having a wavelength band of 400 to 500 nm may be radiated to the second fluorescent filter 62 of the plurality of fluorescent filters 60.

The second fluorescent filter 62 may transmit the fluorescent signal B1-2 having a wavelength band of 400 to 500 nm so as to be incident on the second fluorescent detection unit 82.

The second fluorescent detection unit 82 may convert the incident fluorescent signal B1-2 having a wavelength band of 400 to 500 nm into an electrical signal, may analyze and identify biological particles of the fluorescent signal B1-2 having a wavelength band of 400 to 500 nm based on the converted electrical signal, and may display information about the identified biological particles on the display unit (not shown).

In this case, the biological particles of the fluorescent signal B1-2 having a wavelength band of 400 to 500 nm may be bacteria Consequently, the second fluorescent detection unit 82 may display bacteria on the display unit since the biological particles of the fluorescent signal B1-2 having a wavelength band of 400 to 500 nm are bacteria.

In this state, the fluorescent signal B1 and the scattered signal C1 passing through the second beam splitter may pass through the third beam splitter and move to the scattering filter 70, a description of which will follow.

For example, the scattered signal C1 emitted from the first and second condensing mirror units 30 and 40 may be converted into parallel light through the first lens 1. At this time, the scattered signal C1 converted into the parallel light may pass through the first, second, and third beam splitters 51, 52, and 53. The scattered signal C1 having passed therethrough may be transmitted through the scattering filter 70. At this time, the scattering filter 70 may transmit a scattered signal C1-2 having a wavelength of 350 nm.

The transmitted scattered signal C1-2 having a wavelength of 350 nm may be incident on the scattering detection unit 90.

The scattering detection unit 90 may convert the incident scattered signal C1-2 having a wavelength of 350 nm into an electrical signal, may analyze and determine whether the scattered signal C1-2 having a wavelength of 350 nm indicates biological particles or non-biological particles based on the converted electrical signal, and may display information about the determined non-biological particles on the display unit (not shown).

In this case, the non-biological particles of the scattered signal C1-2 having a wavelength of 350 nm may be dust (e.g., fine dust). Consequently, the scattering detection unit 90 may display "dust" (e.g., "fine dust") on the display unit since the non-biological particles of the scattered signal C1-2 having a wavelength of 350 nm are dust (e.g., fine dust).

According to various embodiments, the first fluorescent detection unit 81 may identify the biological particles as pollen based on the fluorescent signal B1-1 having a wavelength band of 500 to 750 nm incident through the first beam splitter 51, and the second fluorescent detection unit 82 may identify the biological particles as bacteria based on the fluorescent signal B1-2 having a wavelength band of 400 to 500 nm incident through the second beam splitter 52. Since no fluorescent signal is incident thereon, the third fluorescent detection unit 83 does not separately detect biological particles.

In addition, the scattering detection unit 90 may identify the non-biological particles as dust (e.g., fine dust) based on the scattered signal C1-2 having a wavelength of 3500 nm incident through the scattering filter 70.

As such, the first light source unit 21 may radiate ultraviolet light K1 having a wavelength of 280 nm to the interiors of the first and second condensing mirror units 30 and 40 in response to ON/OFF of the first switch 3, and the second light source unit 22 may radiate ultraviolet light K1-1 having a wavelength of 350 nm to the interiors of the first and second condensing mirror units 30 and 40 in response to ON/OFF of the second switch 4. In order to reduce the thickness of the condensing mirror unit L1, the second condensing mirror unit 40 includes first, second, and third spherical reflectors 41, 42, and 43 having first, second, and third curved surfaces, respectively, whereby the side thickness of the second condensing mirror unit 40 may be less than the side thickness of a conventional mirror unit having a single spherical mirror while maintaining a function of reflecting the fluorescent signal B1 and the scattered signal C1, and therefore it is possible to reduce the side thickness of the first and second condensing mirror units 30 and 40 included in the condensing mirror unit L1. When the first and second condensing mirror units 30 and 40 are disposed in a product, therefore, it is possible to thin, miniaturize, and slim the product.

In addition, the first, second, and third beam splitters 51, 52, and 53 and the first, second, and third fluorescent filters 61, 62, and 63 may be disposed along the path of the fluorescent signal B1 and at the same time disposed above and under the path of the fluorescent signal B1 so as to be staggered from each other in different directions, whereby it is possible to further thin, miniaturize, and slim the product.

FIG. 8 is a side view showing the configuration of a sensor device 100 for detecting biological particles and non-biological particles according to another embodiment of the present invention.

Referring to FIG. 8, the sensor device 100 for detecting biological particles and non-biological particles may include at least one light source unit 120 configured to radiate ultraviolet light K2, a condensing mirror unit L10 including a first condensing mirror unit 130 disposed in front of the at least one light source unit 120 and a second condensing mirror unit 140 disposed spaced apart from the first condensing mirror unit 130 the first condensing mirror unit 130 including an aspherical reflector 131 having a curved surface, the second condensing mirror unit 140 including first, second, and third spherical reflectors 141, 142, and 143, a plurality of beam splitters 150 including first and second beam splitters 151 and 152, a plurality of fluorescent filters 160 including first and second fluorescent filters 161 and 162, a scattering filter 170, a plurality of fluorescent detection units 180 including first and second fluorescent detection units 181 and 182, a scattering detection unit 90, and a plurality of light absorption units 191 each having a curved absorbing reflector 191a.

At least one of the components of the sensor device 100 may be identical or similar to at least one of the components of the sensor device 10 shown in FIG. 1, and therefore a duplicate description thereof will be omitted.

According to various embodiments, the plurality of light source units 120 may include first and second light source units 121 and 122. For example, the first and second light source units 121 and 122 may or may not radiate ultraviolet light K2 having a wavelength of 350 nm in response to ON/OFF of a switch 13.

For example, the first and second light source units 121 and 122 may radiate ultraviolet light K2 having a wavelength of 350 nm to the interiors of the first and second condensing mirror units 130 and 140 in response to ON of the switch 13 and at the same time may condense the ultraviolet light K2 on a point.

At this time, a fluorescent signal B2 contained in the air generated at a point between the first and second condensing mirror units 130 and 140 and a scattered signal C2 contained in the air may be reflected by the aspherical reflector 131 of the first condensing mirror unit 130 and radiated to an emission hole 144. At this time, the radiated fluorescent signal B2 and the radiated scattered signal C2 may be emitted out of the first and second condensing mirror units 130 and 140 through the emission hole 144 and at the same time radiated to the first beam splitter 151 of the plurality of beam splitters 151 and 152.

At the same time, the fluorescent signal B2 and the scattered signal C2 generated at a point between the first and second condensing mirror units 130 and 140 may be reflected by at least one of the first, second, and third spherical reflectors 141, 142, and 143 of the second condensing mirror unit 140 and radiated to the aspherical reflector 131 of the first condensing mirror unit 130. At this time, the aspherical reflector 131 of the first condensing mirror unit 130 may reflect back the radiated fluorescent signal B2 and the radiated scattered signal C2, and may radiate the signals to the emission hole 144.

In addition, the fluorescent signal B2 and the scattered signal C2 may be reflected by all of the first, second, and third spherical reflectors 141, 142, and 143 of the second condensing mirror unit 140 and radiated to the aspherical reflector 131 of the first condensing mirror unit 130. In the same manner, the aspherical reflector 131 of the first condensing mirror unit 130 may reflect back the radiated fluorescent signal B2 and the radiated scattered signal C2, and may radiate the signals to the emission hole 144.

At this time, the fluorescent signal B2 and the scattered signal C2 may be reflected by the aspherical reflector of the first condensing mirror unit 130 and the first, second, and third spherical reflectors 141, 142, and 143 of the second condensing mirror unit 140 and radiated to the emission hole 144. At this time, the radiated fluorescent signal B2 and the radiated scattered signal C2 may be emitted out of the first and second condensing mirror units 130 and 140 through the emission hole 144 and at the same time radiated to the first beam splitter 151 of the plurality of beam splitters 151 and 152.

According to various embodiments, a first lens 11 configured to convert the fluorescent signal B2 and the scattered signal C2 into parallel light may be disposed between the second condensing mirror unit 140 and the first beam splitter 151 of the plurality of beam splitters 150. For example, the first lens 11 may convert the fluorescent signal B2 and the scattered signal C2 emitted through the emission hole 144 of the first and second condensing mirror units 130 and 140 into parallel light and move the parallel light to the first beam splitter 151.

For example, the first beam splitter 151 of the plurality of beam splitters 150 may be disposed on the path of the fluorescent signal B2, and the first fluorescent filter 161 may be disposed in front of the first beam splitter 151.

In addition, the second fluorescent filter 162 may be disposed in front of the second beam splitter 152 and at the same time disposed so as to be staggered from the first fluorescent filter 161.

For example, the first fluorescent filter 161 may be disposed at one side of the path of the fluorescent signal B2, and the second fluorescent filter 162 may be disposed at the other side of the path of the fluorescent signal B2, which is opposite the one side. For example, as shown in FIG. 8, the first fluorescent filter 161 may be disposed above the path of the fluorescent signal B2, and the second fluorescent filter 162 may be disposed under the path of the fluorescent signal B2.

In this state, when the first and second light source units 121 and 122 radiate ultraviolet light K2 having a wavelength of 350 nm to the first and second condensing mirror units 130 and 140 the first beam splitter 151 may reflect a fluorescent signal B2-1 having a wavelength band of 550 to 700 nm, which is a part of the fluorescent signal B2 emitted through the first and second condensing mirror units 130 and 140. At this time, the reflected fluorescent signal B2-1 having a wavelength band of 550 to 700 nm may be radiated to the first fluorescent filter 61 of the plurality of fluorescent filters 160.

The first fluorescent filter 161 may transmit the fluorescent signal B2-1 having a wavelength band of 550 to 700 nm so as to be incident on the first fluorescent detection unit 181. For example, a first focusing lens 11a configured to adjust the focus of the fluorescent signal B2-1 having a wavelength band of 550 to 700 nm may be disposed between the first fluorescent filter 161 and the first fluorescent detection unit 181.

For example, the first fluorescent detection unit 181 may convert the incident fluorescent signal B2-1 having a wavelength band of 550 to 700 nm into an electrical signal, may analyze and identify biological particles of the fluorescent signal B2-1 having a wavelength band of 550 to 700 nm based on the converted electrical signal, and may display information about the identified biological particles on the display unit (not shown).

In this case, the biological particles of the fluorescent signal B2-1 having a wavelength band of 550 to 700 nm may be pollen. Consequently, the first fluorescent detection unit 181 may display pollen on the display unit since the biological particles of the fluorescent signal B2-1 having a wavelength band of 550 to 700 nm are pollen.

In addition, the second beam splitter 152 may reflect a fluorescent signal B2-2 having a wavelength of 450 nm, which is a part of the fluorescent signal B2 emitted through the first and second condensing mirror units 130 and 140. At this time, the reflected fluorescent signal B2-2 having a wavelength of 450 nm may be radiated to the second fluorescent filter 162 of the plurality of fluorescent filters 160.

The second fluorescent filter 162 may transmit the fluorescent signal B2-2 having a wavelength of 450 nm so as to be incident on the second fluorescent detection unit 182. For example, a second focusing lens 11b configured to adjust the focus of the fluorescent signal B2-2 having a wavelength of 450 nm may be disposed between the second fluorescent filter 162 and the second fluorescent detection unit 182.

The second fluorescent detection unit 182 may convert the incident fluorescent signal B2-2 having a wavelength of 450 nm into an electrical signal, may analyze and identify biological particles of the fluorescent signal B2-2 having a wavelength of 450 nm based on the converted electrical signal, and may display information about the identified biological particles on the display unit (not shown).

In this case, the biological particles of the fluorescent signal B2-2 having a wavelength of 450 nm may be bacteria Consequently, the second fluorescent detection unit 182 may display bacteria on the display unit since the biological particles of the fluorescent signal B2-2 having a wavelength of 450 nm are bacteria.

In addition, the scattered signal C2 emitted from the first and second condensing mirror units 130 and 140 may be converted into parallel light through the first lens 11. At this time, the scattered signal C2 converted into the parallel light may pass through the first and second beam splitters 151 and 152. The scattered signal C2 that has passed may be transmitted through the scattering filter 170. At this time, the scattering filter 170 may transmit a scattered signal C2-1 having a wavelength of 350 nm.

The transmitted scattered signal C2-1 having a wavelength of 350 nm may be incident on the scattering detection unit 190. For example, a fourth focusing lens 11d configured to adjust the focus of the scattered signal C2-1 having a wavelength of 350 nm may be disposed between the scattering filter 170 and the scattering detection unit 190.

The scattering detection unit 190 may convert the incident scattered signal C2-1 having a wavelength of 350 nm into an electrical signal, may analyze and determine whether the scattered signal C2-1 having a wavelength of 350 nm indicates biological particles or non-biological particles based on the converted electrical signal, and may display information about the determined non-biological particles on the display unit (not shown).

In this case, the non-biological particles of the scattered signal C2-1 having a wavelength of 350 nm may be dust (e.g., fine dust). Consequently, the scattering detection unit 190 may display "dust" (e.g., "fine dust") on the display unit since the non-biological particles of the scattered signal C2-1 having a wavelength of 350 nm are dust (e.g., fine dust).

According to various embodiments, the first fluorescent detection unit 181 may identify the biological particles as pollen based on the fluorescent signal B2-1 having a wavelength band of 550 to 700 nm incident through the first beam splitter 151, and the second fluorescent detection unit 182 may identify the biological particles as bacteria based on the fluorescent signal B2-2 having a wavelength of 450 nm incident through the second beam splitter 152.

In addition, the scattering detection unit 190 may identify the non-biological particles as dust (e.g., fine dust) based on the scattered signal C2-1 having a wavelength of 350 nm incident through the scattering filter 170.

As such, the first and second beam splitters 151 and 152 and the first and second fluorescent filters 161 and 162 may be disposed along the path of the fluorescent signal B2 and at the same time disposed above and under the path of the fluorescent signal B2 so as to be staggered from each other in different directions. As the first and second beam splitters 151 and 152 and the first and second fluorescent filters 161 and 162 are disposed as described above, it is possible to further thin, miniaturize, and slim a product.

The sensor device for detecting biological particles and non-biological particles according to the present invention described above is not limited by the foregoing embodiments and the drawings, and it will be apparent to a person having ordinary skill in the art to which the present invention pertains that various substitutions, modifications, and changes are possible within the technical scope of the present invention.

DESCRIPTION OF REFERENCE SYMBOLS 10, 110: Sensor device
20, 120: At least one light source unit
L1, L10: Condensing mirror unit
30, 130: First condensing mirror unit
40, 140: Second condensing mirror unit
50, 150: Plurality of beam splitters
60, 160: Plurality of fluorescent filters
70, 170: Scattering filter
80, 180: Plurality of fluorescent detection units
90, 190: Scattering detection unit
91, 191: Plurality of light absorption units
K1, K2: Ultraviolet light B1, B2: Fluorescent signal C1, C2: Scattered signal

The invention claimed is:

1. A sensor device comprising:
    at least one light source unit configured to radiate ultraviolet light; and
    a condensing mirror unit comprising a first condensing mirror unit disposed in front of the at least one light source unit and a second condensing mirror unit disposed spaced apart from the first condensing mirror unit, wherein
    the condensing mirror unit reflects a fluorescent signal of biological particles included in air generated by irradiation with the ultraviolet light in an air passage between the first condensing mirror unit and the second condensing mirror unit and a scattered signal of non-biological particles included in the air, and
    the second condensing mirror unit has a plurality of spherical mirrors in order to reduce a thickness of the condensing mirror unit.

2. The sensor device according to claim 1, wherein the second condensing mirror unit comprises:
    a first spherical reflector having a first curved surface;
    a second spherical reflector formed in the first spherical reflector, the second spherical reflector having a second curved surface; and
    a third spherical reflector formed in the second spherical reflector, the third spherical reflector having a third curved surface.

3. The sensor device according to claim 1, wherein the first condensing mirror unit comprises an aspherical reflector having a curved surface.

4. The sensor device according to claim 1, further comprising:
    a plurality of beam splitters disposed on a path of the fluorescent signal and a path of the scattered signal, the plurality of beam splitters being configured to pass the scattered signal and to reflect the fluorescent signal so as to be incident on a plurality of fluorescent filters; and
    a plurality of fluorescent filters disposed in front of the plurality of beam splitters, the plurality of fluorescent filters being disposed at one side of the path of the fluorescent signal and the other side of the path of the fluorescent signal, which is opposite the one side, so as to be staggered from each other in different directions.

5. The sensor device according to claim 1, further comprising:
    a plurality of fluorescent detection units disposed in front of the plurality of fluorescent filters, the plurality of fluorescent detection units being configured to detect the fluorescent signal; and
    a scattering detection unit disposed in front of a scattering filter disposed on the path of the scattered signal, the scattering detection unit being configured to detect the scattered signal.

6. The sensor device according to claim 5, wherein
    the at least one light source unit comprises first and second light source unit,
    the first light source unit radiates or does not radiate ultraviolet light having a wavelength of 280 nm in response to ON/OFF of a first switch,
    the second light source unit radiates or does not radiate ultraviolet light having a wavelength of 350 nm in response to ON/OFF of a second switch,
    when the first switch is turned ON and the second switch is turned OFF, the first light source unit radiates ultraviolet light having a wavelength of 280 nm to the first and second condensing mirror units in response to ON of the first switch, and
    when the first switch is turned OFF and the second switch is turned ON, the second light source unit radiates ultraviolet light having a wavelength of 350 nm to the first and second condensing mirror units in response to ON of the second switch.

7. The sensor device according to claim 6, wherein
    the plurality of beam splitters comprises first, second, and third beam splitters, and
    when the first light source unit radiates ultraviolet light having a wavelength of 280 nm to the first and second condensing mirror units,
    the first beam splitter reflects a fluorescent signal having a wavelength band of 500 to 750 nm, which is a part of a fluorescent signal emitted through the first and second condensing mirror units,
    the second beam splitter reflects a fluorescent signal having a wavelength band of 400 to 500 nm, which is a part of the fluorescent signal emitted through the first and second condensing mirror units,
    the third beam splitter reflects a fluorescent signal having a wavelength band of 300 to 400 nm, which is a part of the fluorescent signal emitted through the first and second condensing mirror units, and
    the first, second, and third beam splitters transmit a scattered signal having a wavelength of 280 nm.

8. The sensor device according to claim 7, wherein
    the plurality of fluorescent filters comprises first, second, and third fluorescent filters, and
    when the first light source unit radiates the ultraviolet light having a wavelength of 280 nm to the first and second condensing mirror units,
    the first fluorescent filter transmits the fluorescent signal having a wavelength band of 500 to 750 nm reflected by the first beam splitter,
    the second fluorescent filter transmits the fluorescent signal having a wavelength band of 400 to 500 nm reflected by the second beam splitter, and
    the third fluorescent filter transmits the fluorescent signal having a wavelength band of 300 to 400 nm reflected by the third beam splitter.

9. The sensor device according to claim 8, wherein the scattering filter transmits a scattered signal having a wavelength of 280 nm.

10. The sensor device according to claim 7, wherein
when the second light source unit radiates ultraviolet light having a wavelength of 350 nm to the first and second condensing mirror units,
the first beam splitter reflects a fluorescent signal having a wavelength band of 500 to 750 nm, which is a part of a fluorescent signal emitted through the first and second condensing mirror units,
the second beam splitter reflects a fluorescent signal having a wavelength band of 400 to 500 nm, which is a part of the fluorescent signal emitted through the first and second condensing mirror units, and
the first and second beam splitters transmit a scattered signal having a wavelength of 350 nm.

11. The sensor device according to claim 8, wherein
when the second light source unit radiates ultraviolet light having a wavelength of 350 nm to the first and second condensing mirror units,
the first fluorescent filter transmits the fluorescent signal having a wavelength band of 500 to 750 nm reflected by the first beam splitter, and
the second fluorescent filter transmits the fluorescent signal having a wavelength band of 400 to 500 nm reflected by the second beam splitter.

12. The sensor device according to claim 11, wherein the scattering filter transmits a scattered signal having a wavelength of 350 nm.

13. The sensor device according to claim 1, further comprising:
a plurality of light absorption units disposed adjacent to the first and second condensing mirror units, the plurality of light absorption units being configured to block the ultraviolet light passing between the first and second condensing mirror units from being incident on the first and second condensing mirror units again, wherein
each of the plurality of light absorption units is provided therein with a curved absorbing reflector configured to reflect and absorb the ultraviolet light.

14. The sensor device according to claim 7, wherein
the first and second light source units radiate or do not radiate ultraviolet light having a wavelength of 350 nm in response to ON/OFF of a switch, and
when the switch is turned ON, the first and second light source units radiate ultraviolet light having a wavelength of 350 nm to the first and second condensing mirror units in response to ON of the switch.

15. The sensor device according to claim 14, wherein
when the first and second light source units radiate ultraviolet light having a wavelength of 350 nm to the first and second condensing mirror units,
the first beam splitter reflects a fluorescent signal having a wavelength band of 500 to 750 nm, which is a part of a fluorescent signal emitted through the first and second condensing mirror units,
the second beam splitter reflects a fluorescent signal having a wavelength band of 400 to 500 nm, which is a part of the fluorescent signal emitted through the first and second condensing mirror units, and
the first and second beam splitters transmit a scattered signal having a wavelength of 350 nm.

16. The sensor device according to claim 8, wherein
when the first and second light source units radiate ultraviolet light having a wavelength of 350 nm to the first and second condensing mirror units,
the first fluorescent filter transmits the fluorescent signal having a wavelength band of 500 to 750 nm reflected by the first beam splitter, and
the second fluorescent filter transmits the fluorescent signal having a wavelength band of 400 to 500 nm reflected by the second beam splitter.

\* \* \* \* \*